US012612191B2

(12) United States Patent
Geuther et al.

(10) Patent No.: US 12,612,191 B2
(45) Date of Patent: Apr. 28, 2026

(54) VTOL AIRCRAFT CAPABLE OF FLYING FORWARD AND BACKWARD

(71) Applicant: UNITED STATES OF AMERICA AS REPRESENTED BY THE ADMINISTRATOR OF NASA, Washington, DC (US)

(72) Inventors: Steven C. Geuther, Lutz, FL (US); David D. North, Williamsburg, VA (US); Brian E. Duvall, Charlottesville, VA (US); Jacob R. Schaefer, Yorktown, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 57 days.

(21) Appl. No.: 18/650,607

(22) Filed: Apr. 30, 2024

(65) Prior Publication Data

US 2024/0375799 A1 Nov. 14, 2024

Related U.S. Application Data

(60) Provisional application No. 63/465,558, filed on May 11, 2023.

(51) Int. Cl.
*B64U 10/25* (2023.01)
*B64U 30/40* (2023.01)
*B64U 50/30* (2023.01)

(52) U.S. Cl.
CPC ............. *B64U 10/25* (2023.01); *B64U 30/40* (2023.01); *B64U 50/30* (2023.01); *B64U 2201/20* (2023.01)

(58) Field of Classification Search
CPC ........ B64U 10/25; B64U 30/40; B64U 50/30; B64U 2201/20; B64U 10/20; B64U 70/40; B64U 50/19; B64C 15/02; B64C 29/02
See application file for complete search history.

(56) References Cited

U.S. PATENT DOCUMENTS 5,086,993 A * 2/1992 Wainfan .................. B64C 3/385
244/34 A
5,340,057 A * 8/1994 Schmittle ................ B64C 29/02
244/7 B (Continued)

*Primary Examiner* — Medhat Badawi
(74) *Attorney, Agent, or Firm* — M. Bruce Harper; Trenton J. Roche; Robin E. Edwards

(57) ABSTRACT

An aircraft includes an onboard power supply, an empennage assembly, and a horizontal main wing each connected to a fuselage, and a vertical cross-wing arranged orthogonally with respect to the main wing. Flight control surfaces are arranged on the empennage assembly, vertical cross-wing, and horizontal main wing. A distributed propulsion system includes a first pair of propellers connected to the horizontal main wing and a second pair of propellers connected to the vertical cross-wing. Each of the propellers is connected to and powered by the power supply. Each propeller forms an acute canting angle with respect to an axis of the particular horizontal main wing or the vertical cross-wing to which the propeller is connected. The flight modes may include vertical takeoff and landing (VTOL), hover mode, rapid descent, and forward and backward flight modes. The propellers are unpowered during the rapid descent mode.

20 Claims, 8 Drawing Sheets

(56)        References Cited

U.S. PATENT DOCUMENTS

| | | | | |
|---|---|---|---|---|
| 5,419,514 | A * | 5/1995 | Ducan | B64C 29/0033 |
| | | | | 244/23 B |
| 5,769,359 | A * | 6/1998 | Rutan | B64C 3/385 |
| | | | | 244/81 |
| 7,658,346 | B2 * | 2/2010 | Goossen | B64U 30/12 |
| | | | | 244/17.11 |
| 9,346,542 | B2 * | 5/2016 | Leng | B64D 27/24 |
| 9,676,479 | B2 * | 6/2017 | Brody | B64C 29/0033 |
| 10,107,196 | B2 * | 10/2018 | Devine | F02K 3/077 |
| 10,124,890 | B2 * | 11/2018 | Sada-Salinas | B64U 70/83 |
| 10,189,565 | B2 * | 1/2019 | Patterson | B64C 37/02 |
| 10,315,761 | B2 * | 6/2019 | McCullough | B64C 39/02 |
| 10,343,773 | B1 * | 7/2019 | McCullough | B64D 25/12 |
| D870,639 | S * | 12/2019 | Ivans | D12/328 |
| 10,501,193 | B2 * | 12/2019 | Oldroyd | B64D 35/08 |
| 10,597,164 | B2 * | 3/2020 | Oldroyd | G05D 3/00 |
| 10,604,249 | B2 * | 3/2020 | McCullough | B64C 39/08 |
| 10,618,647 | B2 * | 4/2020 | McCullough | B64C 29/00 |
| 10,619,698 | B2 * | 4/2020 | Eller | B64C 27/467 |
| 10,625,853 | B2 * | 4/2020 | McCullough | B64C 27/28 |
| 10,633,087 | B2 * | 4/2020 | McCullough | G05D 1/101 |
| 10,633,088 | B2 * | 4/2020 | McCullough | G05D 1/0094 |
| 10,661,892 | B2 * | 5/2020 | McCullough | B64C 25/04 |
| 10,737,765 | B2 * | 8/2020 | Oldroyd | B64U 60/50 |
| 10,737,778 | B2 * | 8/2020 | Oldroyd | B64C 1/32 |
| 10,822,122 | B2 * | 11/2020 | Grose | B64G 1/62 |
| 10,824,149 | B2 * | 11/2020 | Wang | G05D 1/0669 |
| 10,870,487 | B2 * | 12/2020 | McCullough | B64D 25/12 |
| 10,981,650 | B2 * | 4/2021 | Fink | B64C 27/22 |
| 10,981,661 | B2 * | 4/2021 | Oldroyd | B64C 27/52 |
| 11,027,837 | B2 * | 6/2021 | McCullough | B64C 27/57 |
| 11,046,427 | B2 * | 6/2021 | Prager | B64D 25/00 |
| 11,084,579 | B2 * | 8/2021 | Ivans | B64C 3/00 |
| 11,104,446 | B2 * | 8/2021 | McCullough | B64D 31/14 |
| 11,111,010 | B2 * | 9/2021 | Bernard | B64C 27/26 |
| 11,117,657 | B2 * | 9/2021 | Burns | B64C 27/80 |
| 11,124,289 | B2 * | 9/2021 | McCullough | B64U 30/20 |
| 11,208,206 | B1 * | 12/2021 | Auerbach | B64D 31/16 |
| 11,312,491 | B2 * | 4/2022 | Morris | B64C 29/02 |
| 11,319,064 | B1 * | 5/2022 | Wittmaak, Jr. | B64D 9/003 |
| 11,447,244 | B1 * | 9/2022 | Griffin | B64C 29/0033 |
| 11,447,246 | B2 * | 9/2022 | Kunz | B64C 39/04 |
| 11,459,099 | B2 * | 10/2022 | McCullough | B64C 39/08 |
| 11,479,351 | B2 * | 10/2022 | Chan | B64C 39/08 |
| 11,479,352 | B2 * | 10/2022 | McCullough | B64C 29/02 |
| 11,479,354 | B2 * | 10/2022 | McCullough | B64C 39/08 |
| 11,530,035 | B2 * | 12/2022 | Knoll | B64U 30/295 |
| 11,565,790 | B2 * | 1/2023 | Schiller | B64C 11/50 |
| 11,608,173 | B2 * | 3/2023 | McCullough | B64C 39/08 |
| 11,613,349 | B2 * | 3/2023 | North | B64C 29/0075 |
| | | | | 244/7 R |
| 11,613,350 | B1 * | 3/2023 | Bodla | B64D 33/08 |
| | | | | 244/53 R |
| 11,618,560 | B2 * | 4/2023 | St. Clair | B64C 29/0025 |
| | | | | 244/6 |
| 11,630,467 | B2 * | 4/2023 | Wittmaak, Jr. | B64C 29/0091 |
| | | | | 701/3 |
| 11,634,222 | B2 * | 4/2023 | Pei | B64U 50/19 |
| | | | | 244/12.1 |
| 11,643,207 | B1 * | 5/2023 | Ross | B64U 70/50 |
| | | | | 244/3 |
| 11,650,604 | B2 * | 5/2023 | McCullough | B64C 11/02 |
| | | | | 244/7 B |
| 11,673,662 | B1 * | 6/2023 | Schafer | B64U 30/29 |
| | | | | 244/7 B |
| 11,691,722 | B2 * | 7/2023 | Fink | B64C 29/0025 |
| | | | | 244/7 A |
| 11,827,346 | B1 * | 11/2023 | Clark | B64C 27/82 |
| 11,919,631 | B2 * | 3/2024 | Bower | B64D 27/34 |
| 11,932,387 | B2 * | 3/2024 | Wittmaak, Jr. | B64C 29/0033 |
| 11,975,830 | B2 * | 5/2024 | Tighe | G05D 1/0669 |
| 11,993,368 | B2 * | 5/2024 | Clark | B60L 58/12 |
| 12,012,206 | B2 * | 6/2024 | Mikic | B64C 7/00 |
| 12,084,200 | B2 * | 9/2024 | Peters | B64C 29/02 |
| 12,103,673 | B2 * | 10/2024 | Hefner | B64D 1/12 |
| 12,134,466 | B2 * | 11/2024 | Rysdyk | B64U 30/12 |
| 2005/0178879 | A1 * | 8/2005 | Mao | B64C 29/02 |
| | | | | 244/7 B |
| 2013/0105635 | A1 * | 5/2013 | Alzu'bi | B64U 10/14 |
| | | | | 244/23 A |
| 2014/0217229 | A1 * | 8/2014 | Chan | B64U 10/20 |
| | | | | 244/6 |
| 2015/0014475 | A1 * | 1/2015 | Taylor | B64U 10/25 |
| | | | | 244/6 |
| 2016/0023755 | A1 * | 1/2016 | Elshafei | G08G 5/54 |
| | | | | 244/17.23 |
| 2016/0144957 | A1 * | 5/2016 | Claridge | B64U 50/30 |
| | | | | 244/6 |
| 2016/0244158 | A1 * | 8/2016 | Fredericks | B64C 3/40 |
| 2016/0244159 | A1 * | 8/2016 | Bevirt | B64C 15/00 |
| 2016/0288903 | A1 * | 10/2016 | Rothhaar | B64C 9/04 |
| 2016/0325829 | A1 * | 11/2016 | Ahn | B64U 10/14 |
| 2019/0061936 | A1 * | 2/2019 | North | B64C 11/46 |
| 2019/0263516 | A1 * | 8/2019 | McCullough | B64U 30/12 |
| 2020/0172238 | A1 * | 6/2020 | Chan | B64C 3/32 |
| 2020/0172243 | A1 * | 6/2020 | Chan | B64C 11/46 |
| 2021/0122468 | A1 * | 4/2021 | Morris | B64U 50/19 |
| 2021/0253239 | A1 * | 8/2021 | Ivans | B64C 29/02 |
| 2021/0331791 | A1 * | 10/2021 | Geuther | B64C 39/08 |
| 2022/0340308 | A1 * | 10/2022 | Moses | B64G 1/32 |
| 2022/0363376 | A1 * | 11/2022 | Dolejsi | B64C 39/08 |
| 2023/0271700 | A1 * | 8/2023 | Townsend | B64U 60/50 |
| | | | | 244/7 B |
| 2024/0375799 | A1 * | 11/2024 | Geuther | B64U 50/30 |

* cited by examiner

VTOL AIRCRAFT CAPABLE OF FLYING FORWARD AND BACKWARD

CROSS-REFERENCE TO RELATED PATENT APPLICATIONS

This patent application claims the benefit of and priority to U.S. Provisional Patent Application No. 63/465,558 filed on May 11, 2023, which is hereby incorporated by reference in its entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefor.

BACKGROUND

Crewed and uncrewed aircraft systems are used for a wide variety of operational missions. For example, an Unmanned Aerial System (UAS) may be used to perform point-to-point/short-range, low-weight payload deliveries, remote sensing, scientific data collection, search-and-rescue operations, surveillance and reconnaissance, and other airborne missions. Vehicle platforms used to perform such missions may rely on a single fixed-wing configuration employing propeller-driven or jet engine-based propulsion, or on single-rotor, multi-rotor, or tilt-rotor designs. In some instances, the vehicle platform could be configured for performing vertical takeoff and landing (VTOL) missions, and thus rendered capable of taking off, hovering, and landing in a vertical direction relative to a given launch surface. Among other attendant benefits, VTOL capabilities eliminate the need for extended runway surfaces and related infrastructure, thereby increasing mission versatility.

When testing and validating new sensors of types used for entry-descent-landing (EDL) stages of modern spaceborne vehicles, the required test conditions of high ground speeds, low altitudes, and rapid deceleration form atypical flight trajectories relative to the flight trajectories of typical aircraft. While atypical, such trajectories are nevertheless required when simulating planetary landing trajectories during EDL sensor development. While a rocket can produce flight trajectories similar to the aforementioned EDL stages, this occurs at increased expense, higher risk levels, and lack of consistent repeatability. As a result, limited data availability remains a challenge during EDL sensor validation and verification.

SUMMARY

Disclosed herein is a reusable aircraft having multi-mode flight capabilities suitable for duplicating expected entry-descent-landing (EDL) flight trajectories, e.g., in support of future landing missions on the Moon, Mars, asteroids, or other planetary bodies. The aircraft as described herein performs multiple flight modes using distributed propulsion capabilities. Such capabilities collectively enable Vertical Takeoff and Landing (VTOL) operations as one of the flight modes, along with forward and backward wing-borne flight modes, a rotor-driven hover mode, and an unpowered rapid descent mode, with the multi-mode flight capability provided by an onboard avionics system.

The aircraft in a particular embodiment includes an onboard power supply connected to a fuselage, a horizontal main wing connected to the fuselage, and a vertical cross-wing arranged orthogonally with respect to the horizontal main wing. An empennage assembly is also connected to the fuselage. Flight control surfaces are arranged on the empennage assembly, the vertical cross-wing, and the horizontal main wing. The aircraft also includes a distributed propulsion system having a first pair of propellers connected to the horizontal main wing and a second pair of propellers connected to the vertical cross-wing. Each respective propeller of the first and second pairs of propellers are connected to and powered by the onboard power supply, with each propeller forming an acute canting angle with respect to the horizontal main wing or the vertical cross-wing, e.g., less than about 60°.

The aircraft may include an avionics system configured to transition the aircraft between multiple flight modes via control of the distributed propulsion system and the flight control surfaces. The multiple flight modes in one or more embodiments include: (i) a vertical takeoff and landing (VTOL) mode during which the first and second pairs of propellers are powered, (ii) a hover mode, (iii) a rapid descent mode, (iv) a forward flight mode, and (v) a backward flight mode. The propellers are unpowered during the rapid descent mode.

The flight control surfaces may be arranged on the vertical cross-wing include drag flaps, in which case the avionics system could be configured to selectively deploy the drag flaps during the rapid descent mode to increase a drag coefficient and a frontal surface area of the aircraft.

The first set of propellers and the second set of propellers may be optionally equipped with variable pitch blades. In such a configuration, the avionics system transitions between the forward and backward flight modes by selectively adjusting a thrust direction of the propellers via control of the variable pitch blades.

The avionics system may also include an acceleration-to-attitude conversion logic block configured to receive acceleration and velocity commands, and to use the acceleration and velocity commands to compute required attitude and throttle commands for flying the aircraft according to a desired flight trajectory.

The avionics system in a possible implementation is configured to allow the aircraft to perform according to three general operating modes: (i) a manual control mode, during which a remote pilot inputs attitude and throttle signals via a control stick to command an output state of the first pair of propellers and the second pair of propellers, (ii) an automatic mode during which the aircraft flies a pre-programmed mission trajectory, and (iii) a failsafe mode, during which the aircraft flies to a takeoff location, slowly descends, i.e., in a controlled or safe manner, and lands.

The onboard power supply may optionally include an electrochemical battery pack. A combustion engine could be used in conjunction with the electrochemical battery pack, such that the distributed propulsion system is a hybrid electric system.

In one or more embodiments, the fuselage includes a radio frequency (RF) energy-permeable end cap mounted to the tail end of the fuselage to, an optically-clear front dome mounted to a front end of the fuselage, and a sensor suite positioned within the fuselage proximate the optically-clear front dome and/or the RF energy-permeable end cap.

The first pair of propellers and the second pair of propellers together provide the distributed propulsion system with a total of four propellers in a possible construction of the aircraft.

An aspect of the disclosure includes a plurality of cylindrical motor pods each arranged parallel to a longitudinal axis of the fuselage. A corresponding electric motor for each respective propeller of the first set of propellers and the second set of propellers may be disposed within a respective one of the cylindrical motor pods.

The aircraft could be equipped with landing gear posts, each respective one of which is connected to a corresponding one of the motor pods, such that the aircraft is configured to rest on the landing gear posts during VTOL operations.

An aircraft in accordance with another embodiment includes a cylindrical fuselage having a front end and a tail end, an RF energy-permeable end cap mounted to the tail end, and an optically-clear front dome mounted to a front end. The aircraft in this implementation also includes a sensor suite positioned within the fuselage proximate the optically-clear front dome and/or the RF energy-permeable end cap. The sensor suite collects measurement data descriptive of a target landing surface during a multi-mode flight trajectory of the aircraft. An onboard power supply is connected to the fuselage and has an electrochemical battery pack.

As part of this exemplary construction, the aircraft also has a horizontal main wing connected to the fuselage, a vertical cross-wing arranged orthogonally with respect to the horizontal main wing, and including a plurality of drag flaps, and an empennage assembly. The empennage assembly is connected to a tail end of the fuselage, and includes a vertical stabilizer and a horizontal stabilizer each with aerodynamic control surfaces. The aircraft also includes four propellers, including a first pair of propellers connected to the main wing and a second pair of propellers connected to the vertical cross-wing. Each respective one of the four propellers is connected to and powered by the onboard power supply and forms a canting angle of about 30° to about 45° with respect to the main wing or the vertical cross-wing. An avionics system is configured to control the multi-mode flight trajectory as part of the aircraft.

Also described herein is an avionics system for an aircraft. The avionics system includes a sensor suite that is connectable to a fuselage of the aircraft, and a flight controller in communication with the sensor suite and with first and second pairs of motor-driven propellers of the aircraft. The propellers are arranged at an acute canting angle. The flight controller is configured, in response to input signals from the sensor suite and a current state of the aircraft, to control operation of the motor-driven propellers, via output control signals, during a VTOL mode, a hover mode, a forward flight mode, and a backward flight mode.

The flight controller also controls an attitude of the aircraft via flight control surfaces arranged on an empennage assembly connected to a tail end of the fuselage, a horizontal main wing, and a vertical cross-wing that bisects the horizontal main wing, and a horizontal main wing of the aircraft during a rapid descent mode during which the motor-driven propellers are unpowered. The acute canting angle noted above is formed between the motor-drive propellers and the horizontal main wing or the vertical cross-wing to which the motor-drive propellers are connected.

These and other features, advantages, and objects of the present disclosure will be further understood and readily apparent from the following detailed description of the embodiments and best modes for carrying out the disclosure by referring to the specification, claims, and appended drawings.

Figure 1:
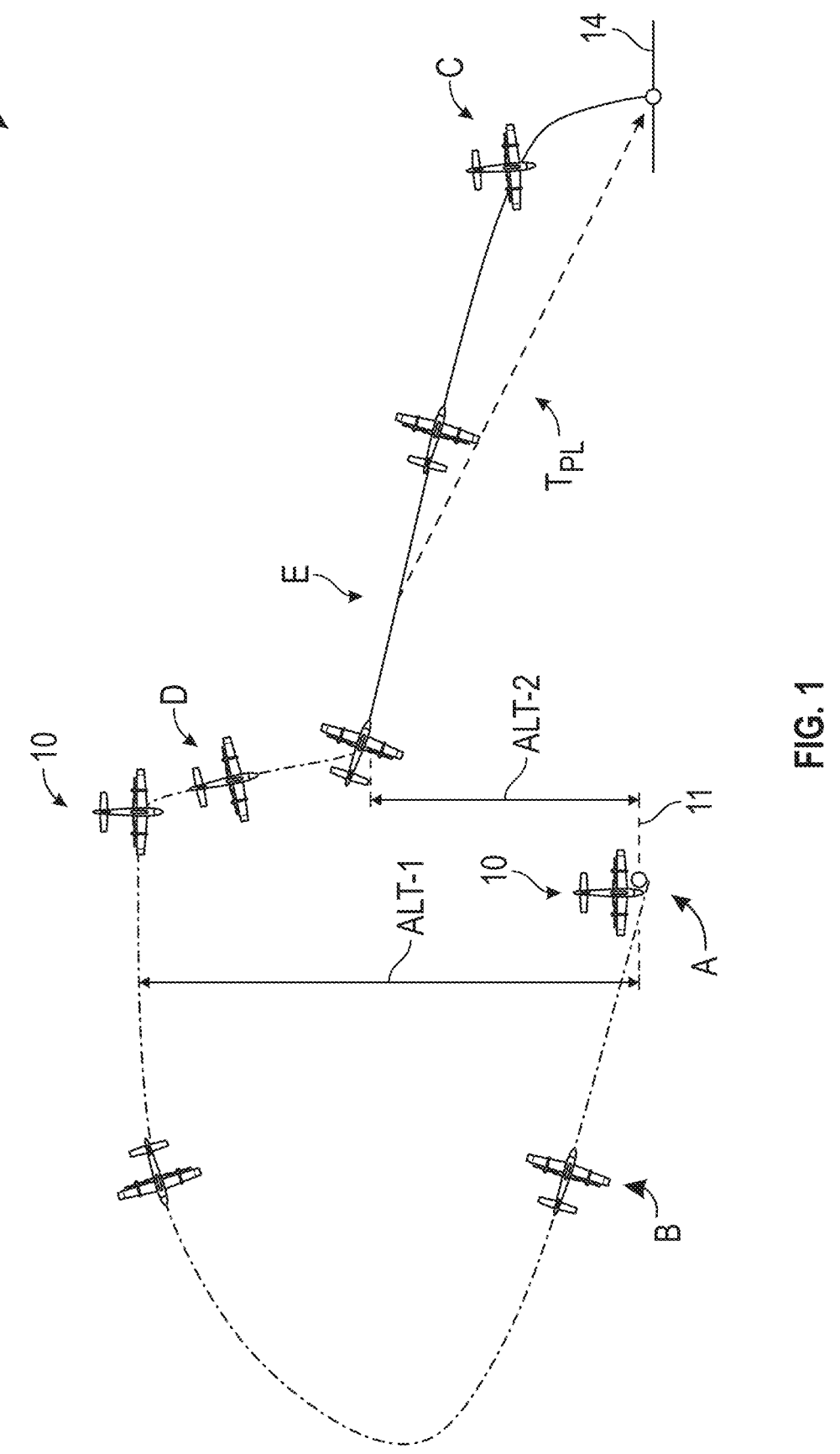
FIG. 1 illustrates a representative multi-mode flight sequence of an aircraft constructed in accordance with the present disclosure.

The present disclosure is amenable to various modifications and alternative forms. Some representative embodiments of the disclosure are shown by way of example in the drawings and will be described in detail herein. Novel aspects of this disclosure are not limited to the particular forms illustrated in the above-enumerated drawings, however. Rather, the present disclosure covers all modifications, equivalents, combinations, permutations, groupings, and alternatives falling within the scope of this disclosure as encompassed, for example, by the appended claims.

DETAILED DESCRIPTION

With reference to the drawings, wherein like reference numbers refer to the same or similar components throughout the several views, an aircraft 10 is depicted schematically in FIG. 1 while performing a representative multi-mode flight sequence 12. The aircraft 10 may be a drone, an Unmanned Aerial Vehicle (UAV), or a piloted aircraft in various embodiments. For illustrative consistency, the aircraft 10 and its associated support systems is illustrated in the various Figures as an Unmanned Aerial System (UAS), without limiting the disclosure to uncrewed implementations. Also, for clarity and simplicity, propulsors and other structure described in detail below have been omitted from FIG. 1.

In a possible scenario, the multi-mode flight sequence 12 may simulate entry-descent-landing (EDL) stages needed for terrestrially-based testing of EDL-related sensors for future space missions. In order to perform the multi-mode flight sequence 12 of FIG. 1, the aircraft 0 is equipped as described in detail below with reference to FIGS. 2-10. As alluded to above, there remains a need for improved flight test vehicles for testing and validation of precision landing and hazard avoidance sensors, particularly during terminal descent trajectories below about 1000 meters (m). Existing commercially-available platforms, whether fixed wing or multi-copter, are unable to meet the challenging flight trajectory and performance requirements for testing sensor systems for EDL stages of human and robotic space exploration. Moreover, development of EDL sensors could require as many as a dozen flights or more per day, with current platforms being unable to provide such a flight rate. The aircraft 10 is configured to address this need by virtue of its multi-mode flight capabilities. Such capabilities allow the aircraft 10 to duplicate expected EDL-specific flight trajectories for sensor development in support of future lunar landing missions, as well as possible landing missions on Mars, Europa, asteroids, and other planetary bodies of interest.

As shown in FIG. 1 and contemplated herein, the multiple modes are illustrated as Modes A-E for clarity, and include: (A) vertical takeoff and landing (VTOL), (B) backward wing-borne flight, (with an optional (C) hover, if desired), (D) rapid descent, (shown transitioning to a forward attitude), and (E) forward wing-borne flight, transitioning to a (C) hover. During VTOL operations, i.e., stage or Mode A of FIG. 1, the aircraft 10 is configured to take off from a designated launch surface 11, e.g., a stationary launch pad or helipad, a deck of a boat, etc. The aircraft 10 may then climb directly to a predetermined target altitude (ALT-1), or possibly first transition to the backward wing-borne flight mode (Mode C) for improved efficiency during the climb. The target altitude (ALT-1), which may be about 1500-2500 meters (m) in a possible implementation, could also be reached in one or more implementations by dropping the aircraft 10 from another aircraft (not shown) flying above the target altitude (ALT-1), with the aircraft 10 thereafter descending to the target altitude (ALT-1) without consuming energy that would otherwise be expended while climbing.

When the multi-mode flight sequence 12 is intended to emulate the EDL flight trajectory noted above, the aircraft 10 may, upon reaching the designated target altitude (ALT-1), transition to the rapid descent mode (Mode D) and forward wing-borne flight (Mode E) as follows. Rapid descent as contemplated herein is required to reduce airspeed of the aircraft 10 when turning on its motor-driven propellers 20 as illustrated in the various figures, and is used to prevent stalling of constituent propeller blades of the propeller 20 and catching of a propeller vortex. Upon attaining a predetermined rate of descent, e.g., about 112 m/s (250 mph, or 217 knots) in the illustrated example, the aircraft 10 may transition to forward wing-borne flight (e.g., Mode E) via a precision landing trajectory (TPL) upon reaching a lower transition altitude (e.g., ALT-2). Aboard the aircraft 10, an onboard sensor suite 62 (see FIG. 9) can gather data descriptive of a target landing surface 14 as the aircraft 10 is flown through a calibrated EDL test condition trajectory. For example, an EDL test condition trajectory could require the aircraft 10 of FIG. 1 to begin with a predetermined vertical speed, e.g., about 60 m/s, and a predetermined lateral speed, e.g., about 95 m/s, and transition through hover mode (Mode C) to a complete standstill (0 m/s vertical and horizontal speeds) upon reaching the target landing surface 14.

Figure 2:
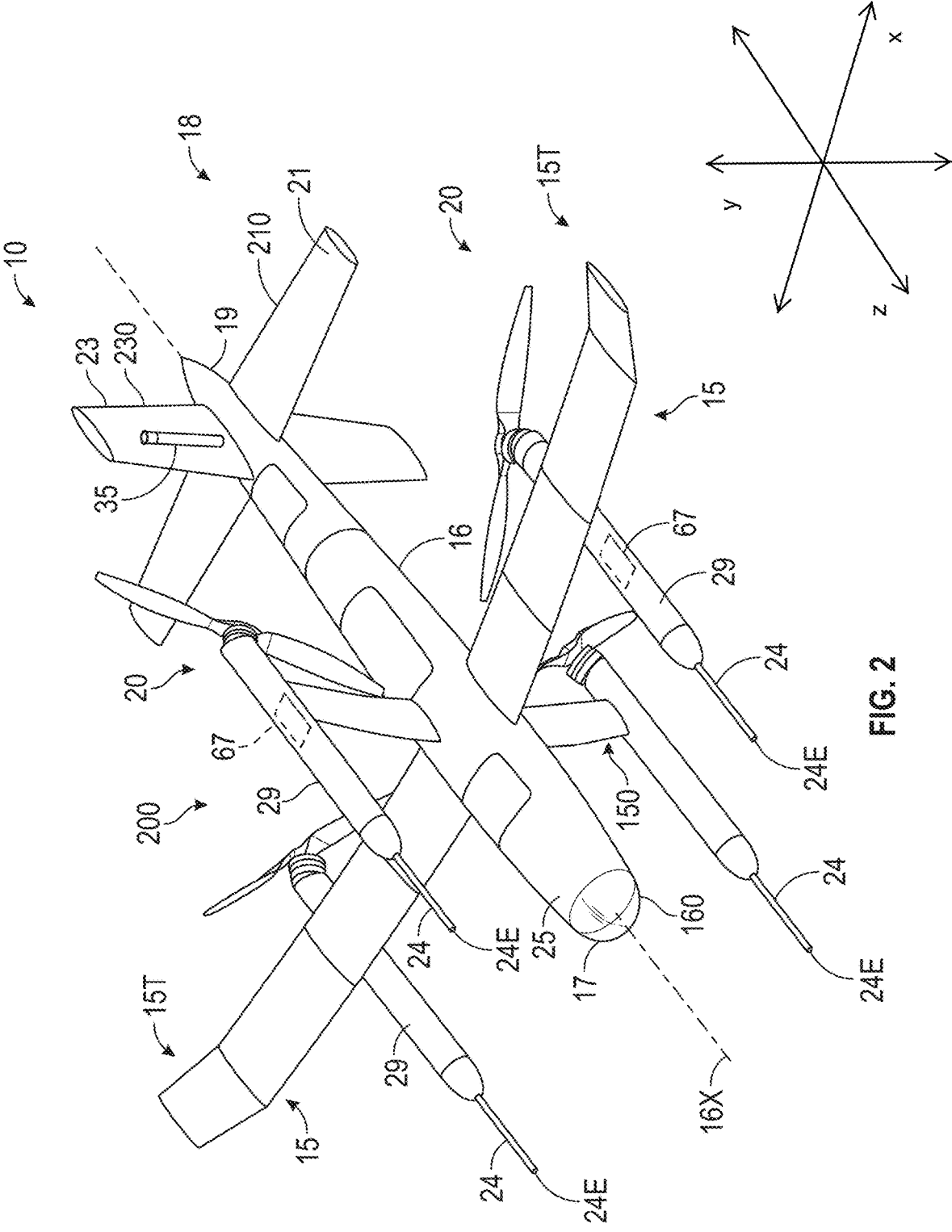
FIG. 2 is a perspective view illustration of a representative embodiment of the aircraft of FIG. 1.

Referring to FIG. 2, in order to perform the representative multi-mode flight sequence 12 illustrated in FIG. 1, the aircraft 10 in a possible embodiment or construction includes a distributed propulsion system 200 in which the motor-driven propellers 20 are arranged in a first set on or connected to a horizontally-oriented main wing 15 and in a second set on or connected to a vertically-oriented cross-wing 150, e.g., as shown, a pair of two propellers 20 in each set/per wing 15 and 150. The latter is arranged orthogonally with respect to the horizontal main wing 15, and thus may bisect the horizontal main wing 15 as shown. The horizontal main wing 15 is connected to fuselage 16, which as shown is cylindrical with a front end or nose 17 and a tail end 19, an empennage assembly 18 connected to the fuselage 16 and having horizontal and vertical stabilizers 21 and 23, and the propellers 20. The horizontal and vertical stabilizers 21 and 23 in turn include trailing edges 210 and 230, respectively, which along with other portions of the aircraft 10 could be equipped with aerodynamic control surfaces 22 (see FIG. 8). Spars 35 may be arranged in the empennage assembly 18 for added support and controllability.

The motor-driven propellers 20, a total of four (i.e., a first and second pair) of which are used in the representative embodiment of FIGS. 2-8, and various flight control surfaces 22 (see FIGS. 5 and 7), enable VTOL operations solely using thrust provided by the propellers 20. Once the aircraft 10 is airborne, the aircraft 10 can smoothly transition to the backward or forward wing-borne flight modes B and E of FIG. 1. During this transition, the aircraft 10 initially enters into a traditional "airplane" configuration in which propellers 20 located at the front of the aircraft 10 and smaller flight control surfaces 22 located at the rear of the aircraft 10 work in concert to reach higher airspeeds relative to, e.g., a traditional multi-copter configuration.

In FIG. 2, fuselage axis 16X is shown running along a z-axis, with an x-axis running horizontally and a y-axis running vertically. The embodiment of aircraft 10 shown in FIG. 2 includes wingtips 15T. As shown, the wingtips 15T form winglets that are removable in one or more embodiments. The wingtips 15T may be angled upward relative to a wing axis 15X (see FIG. 3). The vertical cross-wing 150 is "vertically-oriented" in the sense of being arranged perpendicularly (orthogonally, along the y-axis) to the wing axis 15X and fuselage axis 16X. The cross-wing 150 thus extends both above and below the fuselage 16 and supports a pair of propellers 20, i.e., one motor-driven propeller 20 is located above the fuselage axis 16X and one propeller 20 is located below the fuselage axis 16X. Each propeller 20 in turn forms, or is canted or angled inward at, a predetermined acute angle with respect to an axis 15X or 150X of the horizontal main wing 15 or the vertical cross-wing 150, e.g., of less than about 60° or in a range of about 30° to about 45° in different implementations, as explained in detail below with reference to FIGS. 3 and 7.

Also attached to the horizontal main wing 15 and the vertical cross-wing 150 are generally cylindrical motor pods 29. In this embodiment, the motor pods 29 containing a corresponding electric motor 67 therein can be configured as elongated and possibly tapered cylinders containing therein the necessary wiring, connectors, electric motors, gear sets, etc., required for powering the propellers 20. In the illustrated non-limiting four-propeller configuration of FIG. 2, for example, each motor pod 29 may be arranged parallel to a longitudinal fuselage axis 16X of the fuselage 16 and terminate in a respective one of the propellers 20. An opposing end of the motor pod 29 may be connected to a corresponding landing gear post 24, e.g., an elongated bar of an energy-absorbing material such as plastic or rubber, or of aluminum, such that the aircraft 10 is configured to rest on the landing gear posts 24 at an onset of the VTOL mode or upon completion of the VTOL mode. When resting in such a position, the aircraft 10 is supported on respective distal ends 24E of the landing gear posts 24, both at takeoff and upon landing.

Still referring to FIG. 2, the fuselage 16 in a possible embodiment may be constructed from aluminum, a composite material, or another lightweight but structurally sufficient material. The fuselage 16 may be generally cylindrical, as shown, and may define an interior 160 within which a power supply 25 is disposed. While the construction of the onboard power supply 25 may vary with the intended application, representative embodiments of the onboard power supply 25 include battery electric, hybrid electric, and internal combustion-based sources, e.g., an internal combustion engine alone, or such an engine in conjunction with an electrochemical battery pack, without limitation. Thus, the power supply 25 may include an electrochemical battery pack, in some embodiments. As described below, surfaces of the empennage assembly 18, the horizontal main wings 15, and the vertical cross-wing 150, along with aspects of the propellers 20, collectively enable the aircraft 10 to perform each stage of the multi-mode flight maneuver 12 illustrated in FIG. 1.

Figure 3:
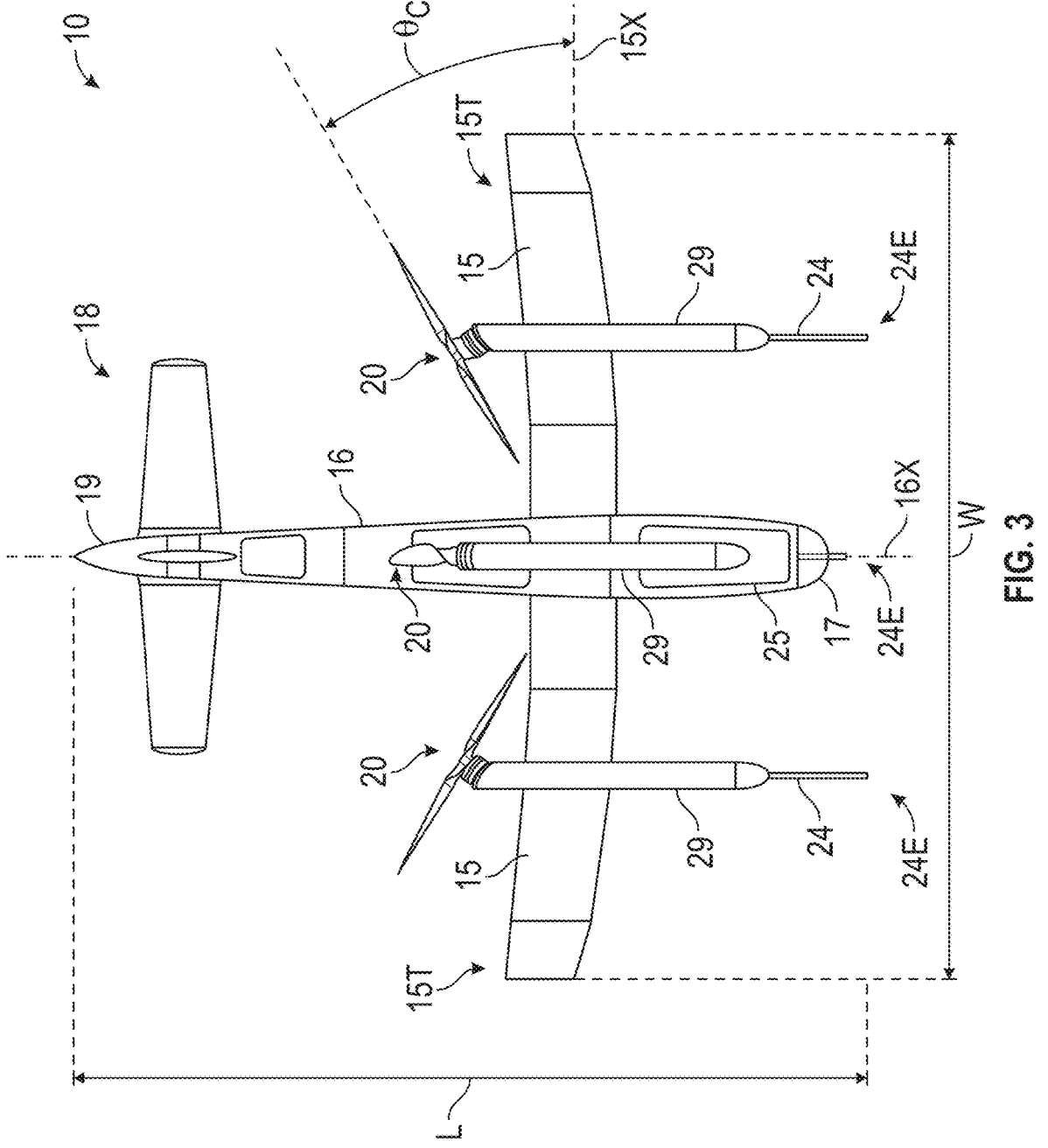
FIG. 3 is a top view illustrations of the aircraft shown in FIGS. 1 and 2.
Figure 5:
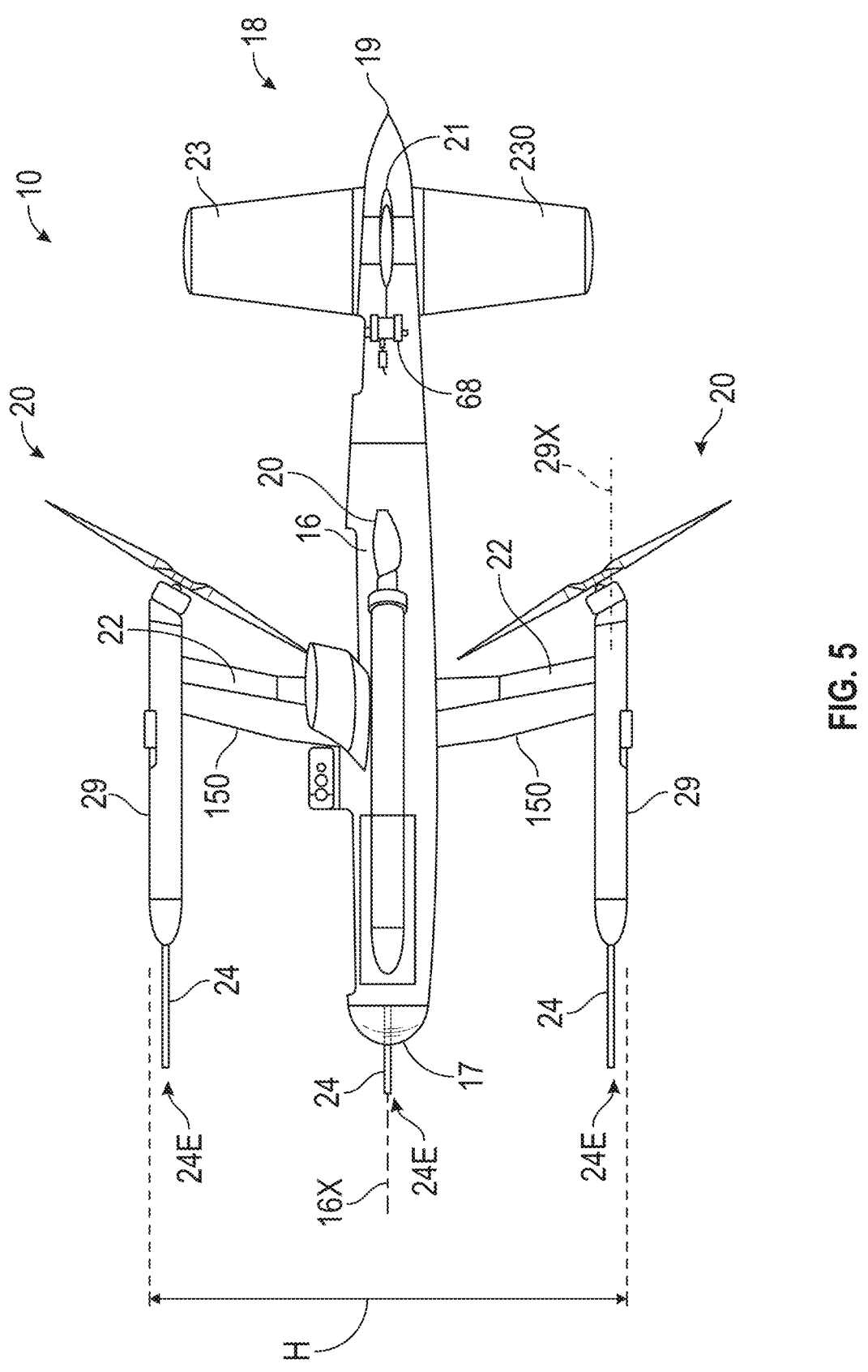
FIGS. 5 and 6 are respective side and front view illustrations of the aircraft of FIGS. 1-4.
Figure 6:
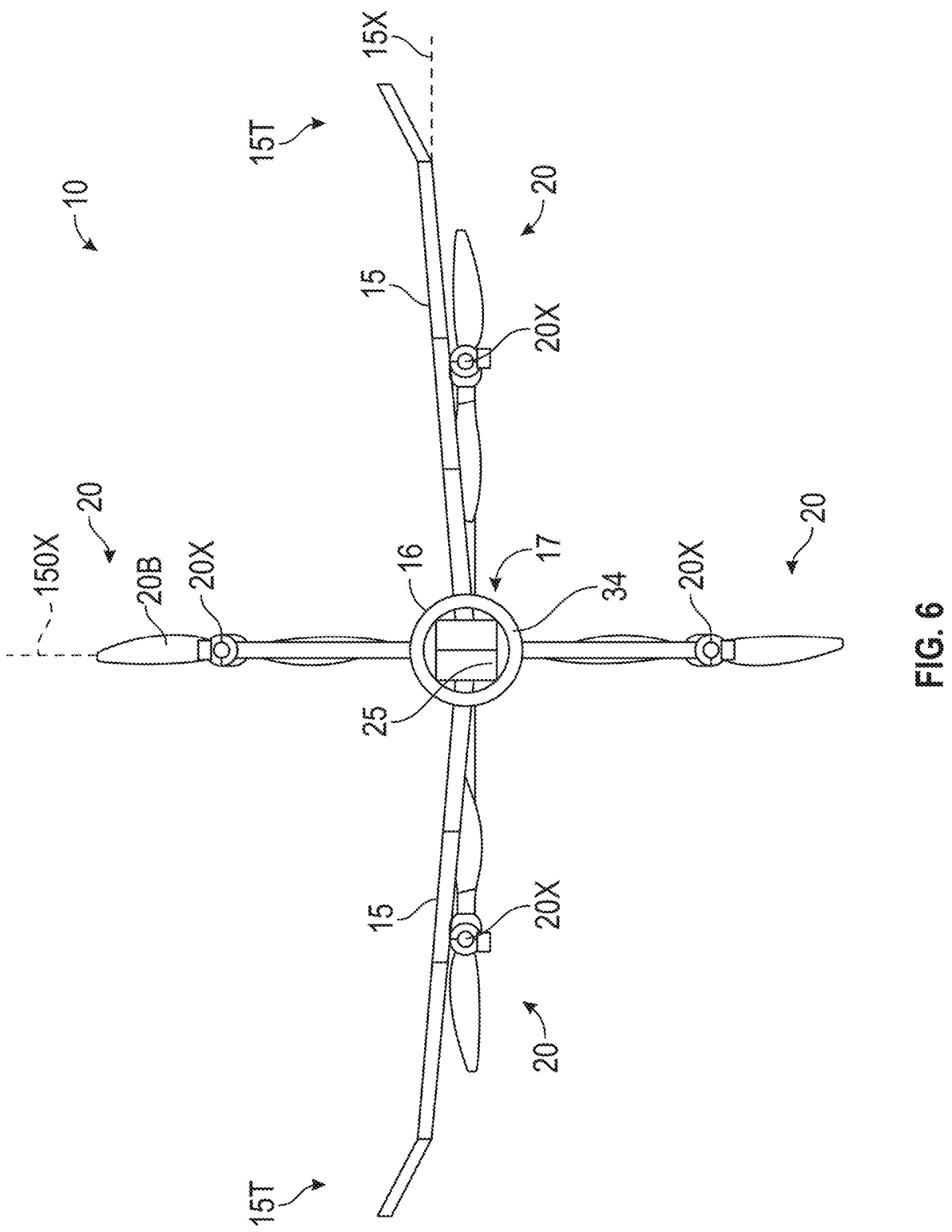

Respective top, side, and front views of the aircraft 10 of FIG. 2 are presented in FIGS. 3, 5, and 6. By way of example and not of limitation, representative dimensions for a scale model of the aircraft 10 included a length (L) from the tail end 19 of the fuselage 16 to the distal end 24E of the landing gear posts 24 of about 70-75 inches (about 1.78-1.91 m). As shown in FIG. 5, the vertical cross-wing 150 may extend over a representative height (H) of about 35-40 in (about 0.89 to 1.02 m), thus forming a height-to-length ratio of approximately 50-55%. In this particular embodiment, the model aircraft 10 has a representative wingspan (W) of about 75-80 in (1.91-2.03 m), as illustrated in FIG. 3.

In some embodiments, the aircraft 10 (see FIG. 6) may include a locking mechanism (not shown), e.g., a translatable pin or electromagnetic brake. Such a locking mechanism could be operable for maintaining alignment of the propellers 20 on the horizontal main wing 15 with the wing axis 15X, and propellers 20 on the vertical cross-wing 150 on the wing axis 150X. Such alignment would help minimize aerodynamic drag on the aircraft 10 due to unpowered rotation of the propellers 20 during some of the enabled flight modes. Also as noted herein, the propellers 20 could be equipped with variable pitch blades 20B (FIG. 6), which could be selectively pivoted into the flow to likewise reduce drag, e.g., via a corresponding linear or rotary blade actuator (not shown) of a type appreciated in the art, e.g., a motorized ball screw, motor, etc.

Referring in particular to the top view of the aircraft 10 shown in FIG. 3, the wingtips 15T of the aircraft 10 may be removable for transport in one or more embodiments. Within the horizontal main wing 15, a plurality of wing spars (not shown), e.g., carbon fiber, such as the of synthetic fibers, plastics, of synthetic resins offered by Dupont Safety & Construction, Inc. under the Kevlar® brand name, may be arranged perpendicular to the fuselage axis 16X. In a possible construction, the horizontal main wing 15 and the vertical cross-wing 150 may have an airfoil shape with an elliptical cross-section, as appreciated in the art. The wing spars could each have a nominal diameter of about 0.8-0.9 in (0.2-0.23 m), with a location of about 33% chord and 75% chord, and with a length exceeding 50% of the wingspan (W).

CONSTRUCTION: in order to construct aircraft 10, the wing spars noted above could be connected into a 3D-printed wing box integrated with the fuselage 16, with the motor pods 29 and landing gear posts 24 mounted below the surface of the airfoil. The fuselage 16 could be constructed with a tapered circular cross-section, which in an embodiment conforming to the above-described dimensions may have a maximum nominal diameter of about 8 in (0.2 m). As noted above, the fuselage 16 could be formed from carbon fiber or a fiberglass composite material, e.g., using molds, with one or more bulkheads (not shown) interposed throughout the fuselage 16 for support.

Figure 4:
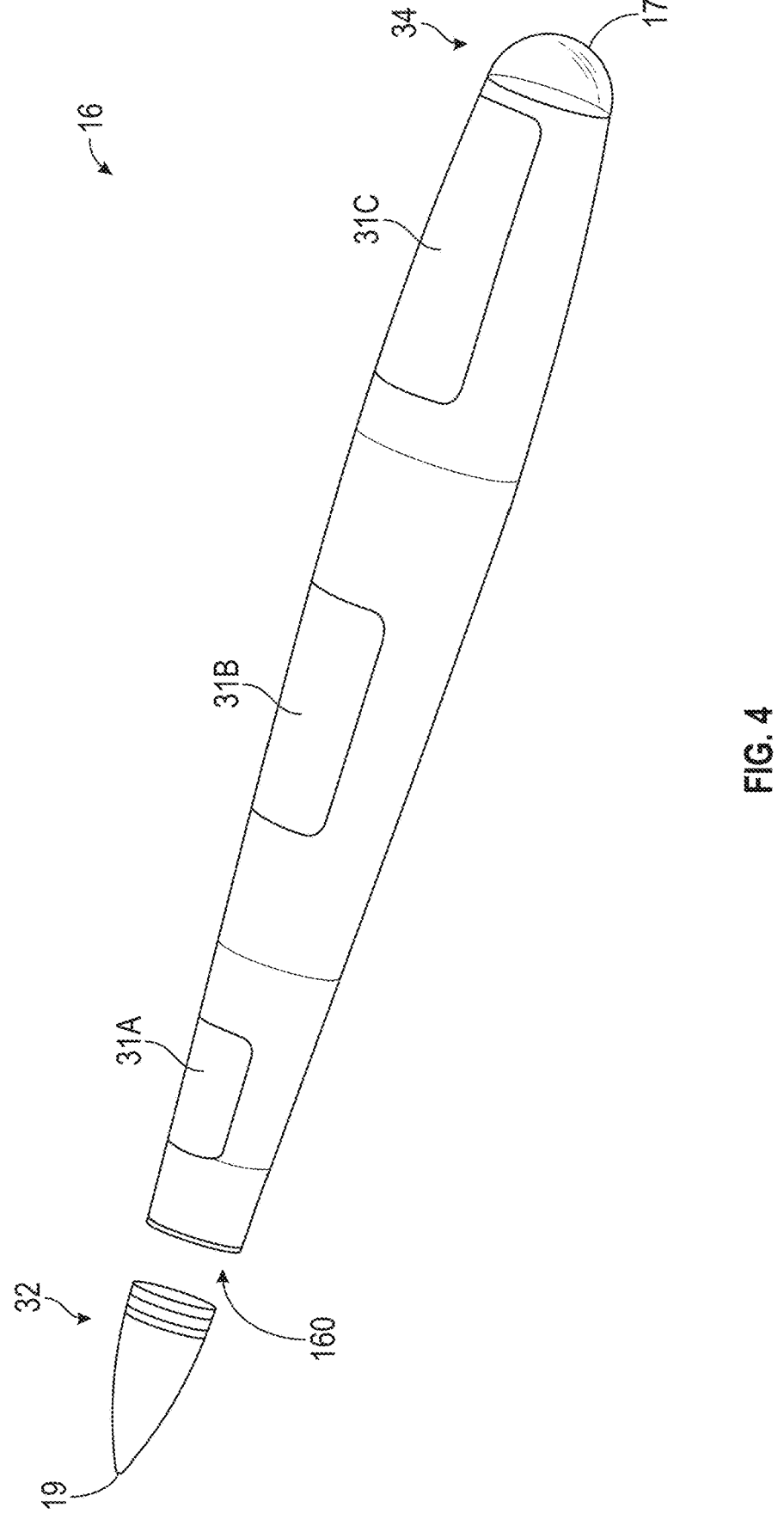
FIG. 4 is a perspective view illustration of a possible embodiment of a fuselage usable as part of the aircraft of FIGS. 1-3.
Figures 9, 10:
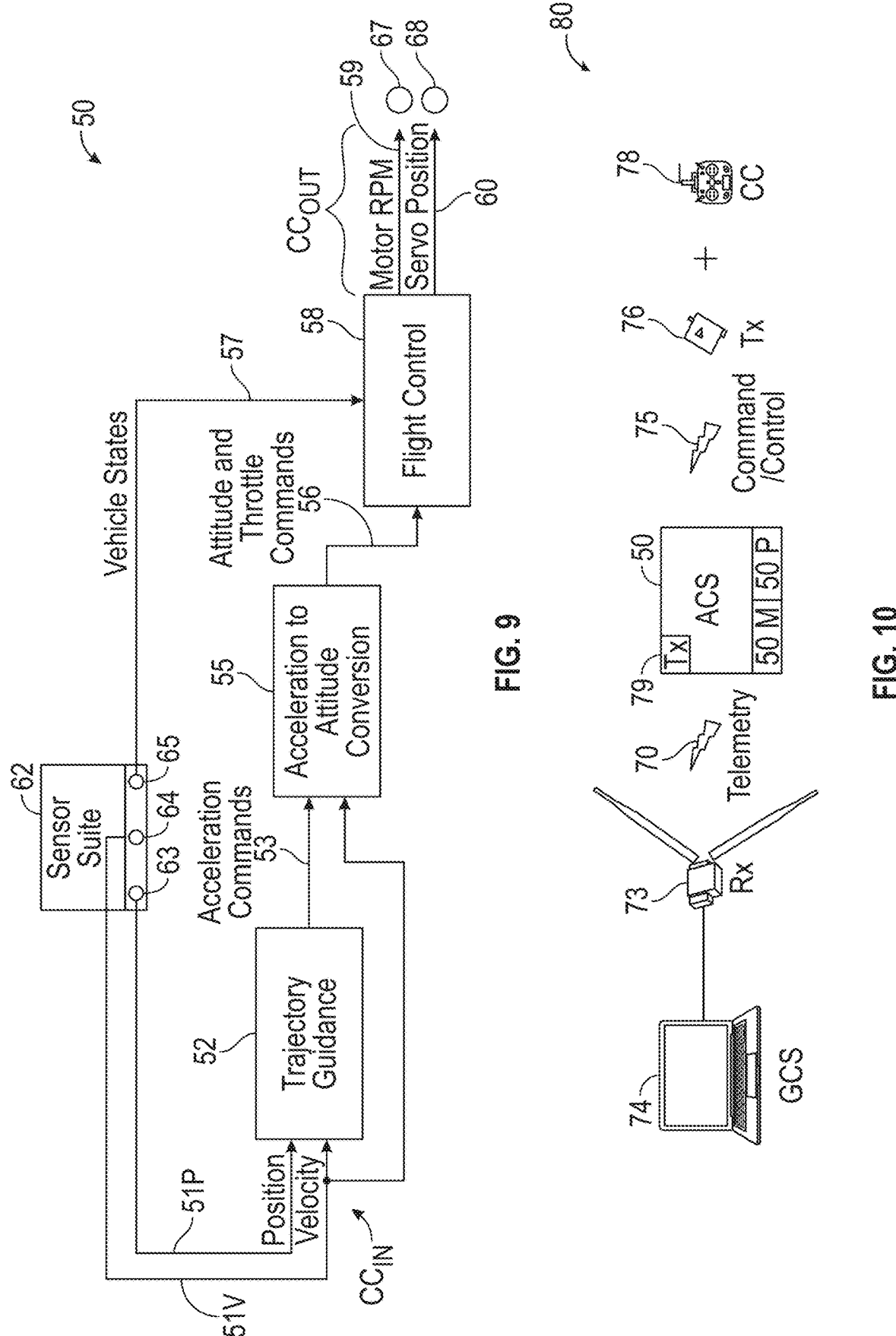
FIG. 9 is a block diagram describing an avionics system for the aircraft of FIGS. 1-8.
FIG. 10 is a schematic illustration of a representative communications architecture for the aircraft described herein.

Referring briefly to FIG. 4, one or multiple hatches 31A, 31B, and 31C could be provided along the fuselage 16, shown as a tapered or teardrop-shaped cylinder, to permit access to the onboard power supply 25 of FIG. 1, the sensor suite 62 of FIG. 9, and other internally installed, transported, or connected avionics hardware. A radio frequency (RF) energy-permeable end cap 32, for example, can be mounted to the fuselage 16 to form the tail end 19. An optically-clear front dome 34, for example, could be disposed at the nose 17 of the fuselage 16, with the sensor suite 62 of FIG. 9 being positioned within the fuselage interior 160 in proximity to the end cap 32 and/or the front dome 34, depending on the application and/or configuration of the particular sensor.

As illustrated in FIGS. 2, 3, and 5, the fuselage 16 is connected to the empennage assembly 18, the respective horizontal and vertical and stabilizers 21 and 23 of which likewise form an elliptical airfoil shape. The horizontal stabilizer 21 and the vertical stabilizer 23 may be outfitted with a single spar 35 (see FIG. 2), e.g., of a diameter of about 0.625 in (1.59 cm) at a location of 50% chord and a length of more than 50% of the span of the horizontal and vertical and stabilizers 21 and 23. Flight control surfaces 22 of the horizontal and vertical and stabilizers 21 and 23 may be controlled via servo-actuators 68 housed within the fuselage 16, as described below with reference to FIG. 9.

CANTING ANGLE: referring to FIG. 5, the vertical cross-wing 150 is shown with its motor-driven propellers 20 mounted to the motor pods 29. The propellers 20 as contemplated herein may be of a fixed-pitch configuration in some embodiments. In such an exemplary case, the set or pair of propellers 20 of vertical cross-wing 150 are arranged at an inward or inboard angle with respect to the shown axis 29X of the motor pods 29. A similar angle may be formed with the set or pair of propellers 20 of horizontal main wing 15 (FIG. 3). An angle is thus also formed relative to wing axes 15X or 150X (FIGS. 3, 6, and 7) of the respective horizontal main wing 15 or vertical cross-wing 150, with this acute angle referred to herein as a "canting" angle ($\theta_C$) (see, e.g., FIG. 7). The canting angle formed is less than about 60° or between about 30-45° in one or more embodiments, i.e., the propellers 20 are angled inward toward the fuselage 16. While forming a propeller canting angle ($\theta_C$) of about 45° or more could be desirable, significant amounts of thrust are lost as one approaches the upper portion of this range, with a thrust loss of about 50% or more as the propeller canting angle ($\theta_C$) approaches about 60°. Therefore, the range of propeller canting angle ($\theta_C$) of about 30-45° may be considered optimal when performing the multi-mode flight maneuver 12 of FIG. 1, with other maneuvers possibly benefiting from a different canting angle ($\theta_C$).

The specified propeller canting angle ($\theta_C$) mitigates a vortex ring state caused by uplift and down lift from the propellers 20, particularly during the rapid descent mode (Mode D of FIG. 1). Flow around the blade tips of the propellers 20 creates a vortex that can be re-ingested, potentially resulting in a sudden and severe loss of lift. As shown in the perspective of FIG. 3, the propellers 20 mounted to the wings 15 are likewise arranged at the propeller canting angle ($\theta_C$), in this case with respect to the axis 15X of the main wing 15. Together, the canting angles of the propellers 20 of the aircraft 10 described herein ensure performance of the aircraft 10 when performing the multi-mode flight maneuver 12 of FIG. 1.

In lieu of being fixed-pitch, the motor-driven propellers 20 could instead be embodied as variable-pitch propellers. This would enable reversal of thrust direction to allow for a change in flight direction. Additionally, a variable-pitch embodiment of the propeller 20, in which the propeller 20 is formed from variable-pitch blades, allows the propeller blades to serve as air brakes during the rapid descent mode (Mode D of FIG. 1). The avionics system 50 of FIGS. 9 and 10 could be configured to control the aircraft 10 through transitions between multiple flight modes, including between the forward flight mode and the backward flight mode by adjusting a thrust direction of the propellers 20 on the horizontal main wing 15 and the vertical cross-wing 150, i.e., first and second sets or pairs of propellers 20, via possible position control of variable pitch blades 20B of the propellers 20 when the propellers 20 are so equipped.

Thus, in a representative flight scenario in which the aircraft 10 is flown up to or dropped down to the altitude (ALT-1) of FIG. 1, the propellers 20 would idle. Gravity acting on the aircraft 10 would cause the aircraft 10 to plummet, at which point control could shift to the aerodynamic flight control surfaces 22 of the horizontal main wing 15, the vertical cross-wing 150, and the empennage assembly 18. As this occurs, the propellers 20 may be slowly brought on line and used to control attitude of the aircraft 10, including possible air braking using the propellers 20 in a possible variable pitch blade construction. Speed control is then established over each of the propellers 20 to maintain attitude of the aircraft 10 and transition through forward flight.

Figure 8:
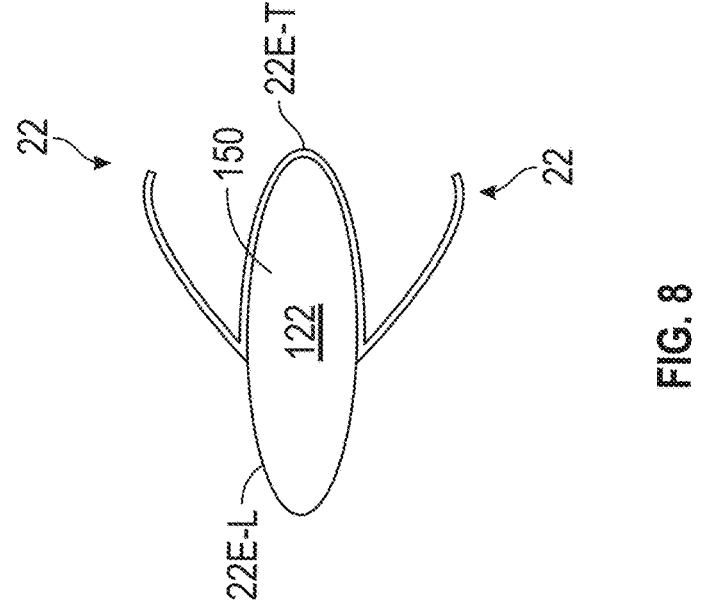
FIG. 8 is a schematic side view illustration of a wing airfoil with deployed drag flaps depicting an aspect of the disclosure.
Figure 7:
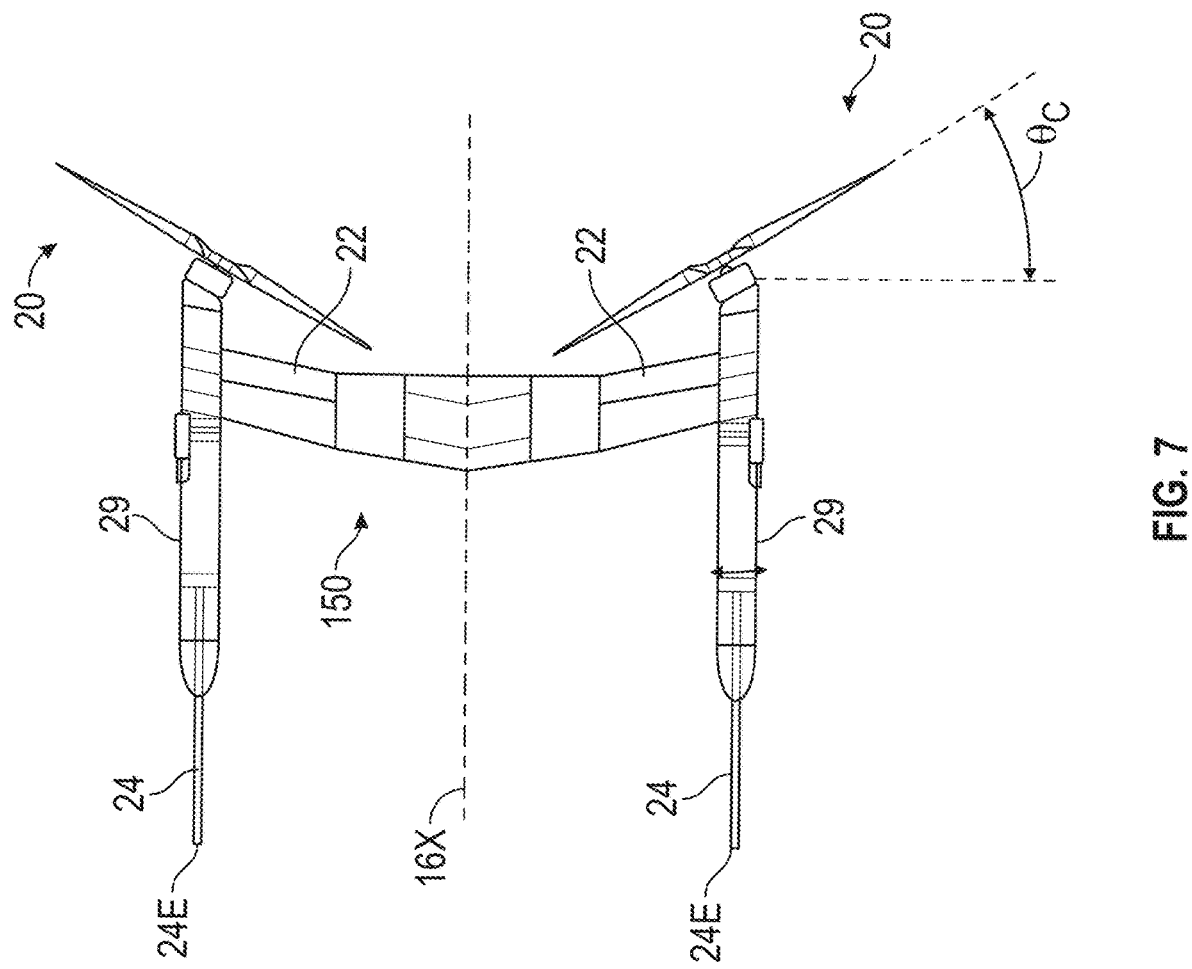
FIG. 7 illustrates a vertical cross-wing and representative acute canting angle of motor-driven propellers of the aircraft shown in FIGS. 1-5.

DRAG FLAP CONTROL: FIG. 8 illustrates a side view of the vertical cross-wing 150 with its flight control surfaces 22 in a deployed state. The flight control surfaces 22, configured here as split drag flaps 122, are connected to at least the vertical cross-wing 150 and have a leading edge 22E-L and a trailing edge 22E-T. When in a stowed position, a trailing edge 22E-T of the split drag flaps 122 rests against the outer surface of the airfoil as shown. When deployed by operation of associated servo actuators 68 housed within the vertical cross-wing 150 or fuselage 16, the split drag flaps 122 pivot away from the outer surface. The trailing edge 22E-T moves into an airstream flowing around the airfoil. The split drag flaps 122 of the vertical cross-wing 150 thereby form airbrakes usable during operation of the aircraft 10 by increasing the drag coefficient and a frontal surface area of the aircraft 10.

FLIGHT CONTROL: referring now to FIG. 9, the aircraft 10 of FIGS. 1-8 includes an avionics system 50 operable for controlling flight operations of the aircraft 10. As appreciated in the art, the avionics system 50 includes computer-based hardware and software for regulating operation of the onboard power supply 25, the above-described motor-driven propellers 20, a navigation system (not shown), and the sensor suite 62. Using the avionics system 50, the aircraft 10 is able to perform according to three general operating modes: (i) a manual control mode, during which a remote pilot (not shown) inputs attitude and throttle signals via a control stick to command an output state of the propellers 20, (ii) an automatic mode during which the aircraft 10 flies according to a pre-programmed mission trajectory, e.g., the exemplary multi-mode flight trajectory 12 of FIG. 1, and (iii) a failsafe mode, during which the aircraft 10 flies back to its takeoff location, enters a slow or controlled descent mode (i.e., at a predetermined safe orientation and speed, so as to prevent a crash or aircraft upset), and then lands.

The avionics system 50 includes the sensor suite 62 and a flight control element or block, also referred to as flight controller 58. The flight controller 58 is in wireless or wired communication with the sensor suite 62 and the propellers 20 or resident control processors thereof. In response to input signals ($CC_{IN}$) from the sensor suite 62 and a current state of the aircraft 10, the avionics system 50 controls operation of the motor-driven propellers 20. This action occurs via output control signals ($CC_{OUT}$) during the various modes A-E of FIG. 1, and enables the flight controller 58 to control an attitude of the aircraft 10 via its flight control surfaces 22 during the rapid descent mode during which the propellers 20 are unpowered.

In the simplified embodiment of FIG. 9, the avionics system 50 is organized into multiple control modules or logic blocks. In response to receipt of input signals ($CC_{IN}$), including a measured position 51P and velocity 51V of the aircraft 10, the avionics system 50 executes one or more algorithms/instruction sets, with the avionics system 50 ultimately transmitting output signals ($CC_{OUT}$) to as electronic commands to the various actuators, i.e., electric motors 67 for the motor-driven propellers 20 and the servo actuators 68 for the flight control surfaces 22. As shown, the output control signals ($CC_{OUT}$) include motor speed signals 59 (in RPM) and servo position 60. Motor control processors (not shown) for a corresponding motor of each propeller 20 act on the motor speed signals 59, while various servo actuators 68 disposed within the empennage assembly 18 or the fuselage 16 act on the servo position signals 60 to change the state of the controlled motor 67 or servo actuator 68.

In order to compute suitable values for the output control signals ($CC_{OUT}$), a trajectory guidance block 52 receives the input signals ($CC_{IN}$) and determines associated acceleration commands 53. That is, the trajectory guidance block 52 reads airspeed and position from corresponding airspeed sensor 63 and an inertial measurement unit (IMU) 64 of the sensor suite 62, and possibly one or more additional sensors 65. The trajectory guidance block 52 outputs the acceleration commands 53 and the velocity commands 51V, with the function to drive the aircraft 10 to fly a desired flight profile.

Downstream of the trajectory guidance block 52, an acceleration-to-attitude conversion block 55 receives the acceleration commands 53 and the velocity commands 51V. Using the same, block 55 computes required attitude and throttle commands 56 for flying according to the desired flight trajectory, whether preprogrammed or autonomously determined. The acceleration-to-attitude conversion block 55, which is in communication with flight control block 58 as noted below, is configured herein to compute, in response to the input signals ($CC_{IN}$), the required attitude and throttle commands needed for flying the aircraft 10 according to a desired flight trajectory, with the flight control block 58 being configured to determine the output control signals ($CC_{OUT}$) in response to the required attitude and throttle commands 56 from the acceleration-to-attitude conversion block 55.

As airspeed of the aircraft 10 changes, the attitude (pitch, yaw, roll) required to achieve a desired acceleration of the aircraft 10 varies, and also requires computation to factor in velocity in commanding a particular attitude. For example, at lower airspeeds, the aircraft 10 may move away from a given point in free space. The nose 17 (FIG. 2) is pitched towards the point as the thrust vector of the propellers 20 is adjusted. At higher airspeeds when moving away from the same point, however, the nose 17 is pitched away to generate an angle of attack and lift. Therefore, as the aircraft 10 changes from thrust-dominated control to wing-borne control when performing the multi-mode flight trajectory 12, the avionics system 50 of FIG. 9 computes the required attitude for achieving a given acceleration.

A flight control block (flight controller) 58 may receive the attitude and throttle commands 56 from the conversion block 55, possibly along with present vehicle states 57, with the latter describing the current operating state of the aircraft 10 and its various constituent subsystems. The output control signals ($CC_{OUT}$) could be extracted from one or more lookup tables or calculated in real-time to control the flight trajectory and mode transitions. The flight control block 58 blends control between use of the servos and motors based on airspeed and direction of travel, while also scheduling gains with airspeed. The flight control block 58 is thus configured to control the attitude of the aircraft 10 via the output control signals ($CC_{OUT}$), including during the rapid descent mode by selectively deploying the drag flaps 122 via the output control signals ($CC_{OUT}$).

In a possible configuration, the avionics system 50 may utilize proportional-integral-derivative (PID) controls when processing altitude and rate feedback, for control of the propellers 20, and feedforward proportional-integral (PI) controls for wing-borne control. The required attitude for achieving a desired acceleration change with airspeed and mode of flight. An inner control loop could be used to gain schedule with airspeed due to the aircraft 10 being statically unstable in backward flight (Mode B of FIG. 1), unstable at low speeds in multirotor-dominated flight (Mode C), and stable in forward/high-speed slight (Mode E, i.e., hover). Outputs for control of the propellers 20 and fins could be blended as a function of nose-ward airspeed, where the flight control surfaces 22 are used in reverse for high backward and forward speeds, and the propellers 20 at low positive and negative speeds. Outer-loop PIDs may be used to control position and velocity to track airspeed and trajectory.

Referring to FIG. 10, a communications architecture 80 for the avionics system 50 described above is illustrated in simplified form as a single computational node in remote communication with a ground-based control device. In a possible implementation, for instance, the communications architecture 80 could use a transmitter (Tx) 79 and telemetry signals 70 of an application-suitable frequency to communicate with a ground receiver (Rx) 73, which in turn may be accessed via a ground control station (GCS) 74. An operator using the ground control station 74 could communicate with the aircraft 10 using such an approach, or the ground control station 74 could be programmed to relay control signals to the aircraft 10. A command/control link 75 of an application-suitable frequency could be used to communicate with the aircraft 10 using a transmitter (Tx) 76 and control console (CC) 78 in another implementation, with the control console 78 possibly being pilot-operated by remote ground-based aircrew. In still other embodiments, the communications architecture 80 could be programmed to fly the representative multi-stage flight trajectory 12 of FIG. 1 in a fully autonomous manner.

The term flight controller, control system, avionics system, and related terms such as control module, module, control, control unit, processor, and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of computer-readable storage devices or memory 50M (read only, programmable read only, random access, hard drive, etc.). Non-transitory components of memory 50M are those which are capable of storing machine-readable instructions in the form of one or more software or firmware programs or routines, combinational logic circuit(s), input/output circuit(s) and devices, signal conditioning and buffer circuitry and other components that can be accessed by one or more processor(s) 50P to provide the described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example about 50-100 microsecond (ms) intervals during ongoing operation. Alternatively, routines may be executed in response to occurrence of a triggering event.

The aircraft 10 as described above with reference to FIGS. 1-10, with its distributed propulsion system 200, is thus rendered capable of performing the multi-mode flight trajectory 12 of FIG. 1 and its included VTOL operations using thrust provided by the propellers 20. Once the aircraft 10 is airborne, the aircraft 10 can smoothly transition to forward or backward wing-borne flight mode. During such a transition, the aircraft 10 initially enters into a traditional "airplane" configuration in which motor-driven propellers 20 located at the front of the aircraft 10 and smaller flight control surfaces 22 located at the rear of the aircraft 10 work in concert to reach higher airspeeds relative to, e.g., a traditional multi-copter configuration.

Upon achieving wing-borne flight in a given horizontal direction, the aircraft 10 is able to transition to wing-borne flight in the opposite direction. The aircraft 10 is also able to decelerate rapidly, which is another important requirement of EDL simulation of the type contemplated herein, with a selectively increased drag coefficient and increased frontal surface area when the propellers 20 are not powered. In this manner, the aircraft 10 may be used to test sensors, software, and other components under simulated EDL conditions with a lower flight total and increased flight turnaround time. These and other benefits of the present disclosure will be readily appreciated by those skilled in the art having the benefit of the foregoing disclosure.

For purposes of description herein, the terms "upper," "above," "lower," "right," "left," "rear," "aft," "front," "fore", "vertical," "horizontal," and derivatives thereof shall relate to the invention as oriented in FIGS. 1 and 2. However, various alternative orientations and step sequences are possible, except where expressly specified to the contrary. The specific devices and processes illustrated in the drawings and described in the following specification are intended as exemplary embodiments of the structure or processes as defined in the appended claims. Hence, specific dimensions and other physical characteristics relating to the representative embodiments disclosed herein are not limiting, unless the claims expressly state otherwise.

For purposes of this Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may also be used with respect to an aircraft operation, such as in a forward flight direction of an aircraft operatively oriented relative to a ground surface.

The detailed description and the drawings or figures are supportive and descriptive of the disclosure, but the inventive scope is defined solely by the claims. While embodiments for carrying out the disclosure have been described in detail herein, various alternative designs and embodiments exist within the intended scope of this disclosure. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An aircraft, comprising:

a fuselage;

an onboard power supply connected to the fuselage;

a horizontal main wing connected to the fuselage;

a vertical cross-wing arranged orthogonally with respect to the horizontal main wing;

an empennage assembly connected to the fuselage at a tail end of the fuselage, the empennage assembly including a vertical stabilizer and a horizontal stabilizer;

flight control surfaces arranged on the empennage assembly, the vertical cross-wing, and the horizontal main wing; and a distributed propulsion system configured to provide the aircraft with a forward wing-borne flight mode, a backward wing-borne flight mode, and a rapid descent mode, the distributed propulsion system including a first pair of propellers connected to the horizontal main wing aft of the horizontal main wing during the forward wing-borne flight mode, and a second pair of propellers connected to the vertical cross-wing, wherein each respective propeller of the first pair of propellers and the second pair of propellers is connected to and powered by the onboard power supply and forms an acute canting angle with respect to the horizontal main wing or the vertical cross-wing, and wherein the aircraft in the rapid descent mode is controlled to descend at a predetermined rate of descent configured to prevent stalling of the propeller blades and catching of a propeller vortex.

2. The aircraft of claim 1, further comprising:

an avionics system configured to control the aircraft through transitions between multiple flight modes, via the distributed propulsion system and the flight control surfaces, the multiple flight modes including: (i) a vertical takeoff and landing (VTOL) mode during which the first pair of propellers and the second pair of propellers are powered, (ii) a hover mode, (iii) the rapid descent mode, (iv) the forward wing-borne flight mode, and (v) the backward wing-borne flight mode.

3. The aircraft of claim 2, wherein the flight control surfaces arranged on the vertical cross-wing include drag flaps, and wherein the avionics system is configured to selectively deploy the drag flaps during the rapid descent mode to increase a drag coefficient and a frontal surface area of the aircraft.

4. The aircraft of claim 2, wherein the first pair of propellers and the second pair of propellers are equipped with variable pitch blades, and wherein the avionics system is configured to transition between the forward wing-borne flight mode and the backward wing-borne flight mode by selectively adjusting a thrust direction of first pair of propellers and the second pair of propellers via the variable pitch blades.

5. The aircraft of claim 2, wherein the avionics system includes an acceleration-to-attitude conversion block configured to receive acceleration commands and velocity commands, and to use the acceleration commands and the velocity commands to compute required attitude and throttle commands for flying the aircraft according to a desired flight trajectory.

6. The aircraft of claim 2, wherein the avionics system is configured to allow the aircraft to perform according to three general operating modes: (i) a manual control mode, during which a remote pilot inputs attitude and throttle signals via a control stick to command an output state of the first pair of propellers and the second pair of propellers, (ii) an automatic mode during which the aircraft flies a pre-programmed mission trajectory, and (iii) a failsafe mode, during which the aircraft flies to a takeoff location, descends, and lands.

7. The aircraft of claim 1, wherein the acute canting angle is less than about 60° and is configured to mitigate a vortex ring state caused by uplift and down lift from the propellers.

8. The aircraft of claim 1, wherein the onboard power supply includes an electrochemical battery pack.

9. The aircraft of claim 8, wherein the onboard power supply includes a combustion engine in conjunction with the electrochemical battery pack, such that the distributed propulsion system is a hybrid electric system.

10. The aircraft of claim 1, wherein the fuselage includes a radio frequency (RF) energy-permeable end cap mounted to a tail end of the fuselage, an optically-clear front dome mounted to a front end of the fuselage, and a sensor suite positioned within the fuselage proximate the optically-clear front dome and/or the RF energy-permeable end cap.

11. The aircraft of claim 1, wherein the first pair of propellers and the second pair of propellers together provide the distributed propulsion system with a total of four propellers.

12. The aircraft of claim 1, further comprising:

a plurality of cylindrical motor pods each arranged parallel to a longitudinal axis of the fuselage, wherein a corresponding electric motor for each respective propeller of the first set of propellers and the second set of propellers is disposed within a respective one of the cylindrical motor pods.

13. The aircraft of claim 12, further comprising:

a plurality of landing gear posts, wherein each respective one of the landing gear posts is connected to a corresponding one of the cylindrical motor pods, such that the aircraft is configured to rest on the landing gear posts.

14. An aircraft, comprising:

a cylindrical fuselage having a front end and a tail end, a radio frequency (RF) energy-permeable end cap mounted to the tail end, and an optically-clear front dome mounted to a front end;

a sensor suite positioned within the fuselage proximate the optically-clear front dome and/or the RF energy-permeable end cap, wherein the sensor suite is config-
ured to collect measurement data descriptive of a target
landing surface during a multi-mode flight trajectory of
the aircraft;

an onboard power supply connected to the fuselage and
having an electrochemical battery pack;

a horizontal main wing connected to the fuselage;

a vertical cross-wing arranged orthogonally with respect
to the horizontal main wing, and including a plurality
of drag flaps;

an empennage assembly connected to a tail end of the
fuselage, the empennage assembly including a vertical
stabilizer and a horizontal stabilizer each with aerody-
namic control surfaces;

four propellers, including a first pair of propellers con-
nected to the main wing and a second pair of propellers
connected to the vertical cross-wing, wherein each
respective one of the four propellers of the first pair of
propellers and the second pair of propellers is con-
nected to and powered by the onboard power supply
and forms a canting angle of about 30° to about 45°
with respect to the main wing or the vertical cross-
wing; and an avionics system configured to control the multi-mode
flight trajectory.

15. The aircraft of claim 14, wherein multiple flight
modes of the multi-mode flight trajectory include: (i) a
vertical takeoff and landing (VTOL) mode, (ii) a hover
mode, (iii) a rapid descent mode during which the aircraft is
controlled to descend at a predetermined rate of descent
configured to prevent stalling of the propeller blades and
catching of a propeller vortex, (iv) a forward wing-borne
flight mode, and (v) a backward wing-borne flight mode, and
wherein the avionics system is configured to selectively
deploy the drag flaps during the rapid descent mode to
increase a drag coefficient and a frontal surface area of the
aircraft.

16. The aircraft of claim 15, wherein the first pair of
propellers and the second pair of propellers are equipped
with variable pitch blades, and wherein the avionics system
is configured to transition between the forward wing-borne
flight mode and the backward wing-borne flight mode by
adjusting a thrust direction of the first pair of propellers and
the second pair of propellers via the variable pitch blades.

17. An avionics system for an aircraft, comprising:

a sensor suite connectable to a fuselage of the aircraft; and a flight controller in communication with the sensor suite
and first and second pairs of motor-driven propellers of
the aircraft, wherein the motor-driven propellers is arranged at an acute canting angle, and wherein the
flight controller is configured, in response to input
signals from the sensor suite and a current state of the
aircraft, to control:

operation of the motor-driven propellers, via output
control signals, during a vertical takeoff and landing
(VTOL) mode, a hover mode, a forward wing-borne
flight mode, and a backward wing-borne flight mode;
and an attitude of the aircraft via flight control surfaces
arranged on an empennage assembly connected to a
tail end of the fuselage, a horizontal main wing, and
a vertical cross-wing that bisects the horizontal main
wing during a rapid descent mode during which the
aircraft is controlled to descend at a predetermined
rate of descent configured to prevent stalling of the
propeller blades and catching of a propeller vortex,
wherein the acute canting angle is formed between
the motor-drive propellers and the horizontal main
wing or the vertical cross-wing to which the motor-
drive propellers are connected.

18. The avionics system of claim 17, wherein the flight
control surfaces include drag flaps connected to the vertical
cross-wing, and wherein the flight controller is configured to
control the attitude of the aircraft during the rapid descent
mode, via the output control signals, by selectively deploy-
ing the drag flaps.

19. The avionics system of claim 17, further comprising:

an acceleration-to-attitude conversion block in commu-
nication with the flight controller, wherein the accel-
eration-to-attitude conversion block is configured, in
response to the input signals, to compute required
attitude and throttle commands for flying the aircraft
according to a desired flight trajectory, and wherein the
flight controller is configured to determine the output
control signals in response to the required attitude and
throttle commands from the acceleration-to-attitude
conversion block.

20. The avionics system of claim 17, wherein the avionics
system is configured to allow the aircraft to perform accord-
ing to three general operating modes: (i) a manual control
mode, during which a remote pilot inputs attitude and
throttle signals via a control stick to command an output
state of the first and second pairs of motor-driven propellers,
(ii) an automatic mode during which the aircraft flies a
pre-programmed mission trajectory, and (iii) a failsafe
mode, during which the aircraft flies to a takeoff location,
descends, and lands.

* * * * *